(No Model.)
W. T. ROBERTSON.
FLEXIBLE SELF GAGING FAUCET.
No. 266,894. Patented Oct. 31, 1882.
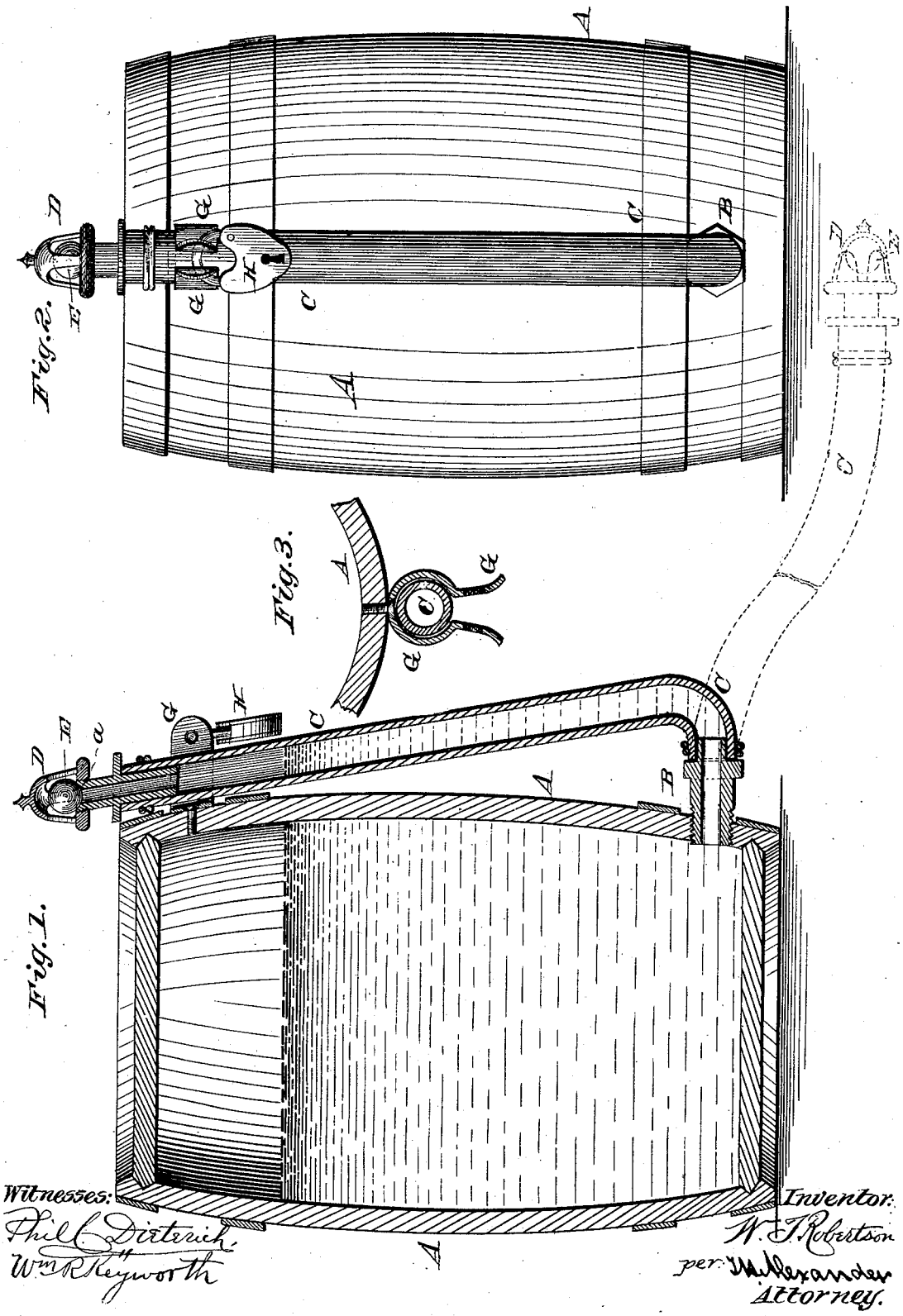
Witnesses:
Phil C. Dietrich
Wm R. Heyworth
Inventor:
W. T. Robertson
per Wm Alexander
Attorney.

United States Patent Office.

WILLIAM T. ROBERTSON, OF MONTGOMERY, ALABAMA.

FLEXIBLE SELF-GAGING FAUCET.

SPECIFICATION forming part of Letters Patent No. 266,894, dated October 31, 1882.

Application filed September 9, 1882. (No model.)

*To all whom it may concern:*

Be it known that I, W. T. ROBERTSON, of Montgomery, in the State of Alabama, have invented certain new and useful Improvements in Flexible Self-Gaging Faucets; and I do hereby declare that the following is a full, clear, and exact description thereof, reference being had to the accompanying drawings, and to the letters of reference marked thereon, which form part of this specification, and in which—

Figure 1 is a vertical diametrical section through a barrel having my improved flexible faucet applied to it, and showing the faucet adjusted in two positions. Fig. 2 is a front elevation of a barrel or cask having my improvement applied to it. Fig. 3 is a detail showing the device for holding the tube C in an upright position.

This invention relates to means for drawing liquids from vessels; and the nature of my invention consists broadly in a flexible faucet, and also in the combination of a spring-clip with such faucet, as will be fully understood from the following description, when taken in connection with the annexed drawings.

The letter A designates a barrel or case, of any suitable description, adapted to contain beer, oil, or other liquid. At or near the lower end of the vessel A, I screw into it a "tap" or tubular plug, B, and on the outer end of this tap B, I secure in a suitable manner a flexible tube, C. This tube C is provided on its free end with a metal cage, D, in which is a ball or spherical valve, E, so arranged and adapted to a seat, *a*, that when the said flexible tube is erected there will be no possibility of the entrance of air into the vessel A. When the free end of the tube C is depressed, as indicated in dotted lines, Fig. 1, liquid will flow through it.

It will be seen, from what I have above described, that practically I have a flexible faucet which is provided with an automatic valve, and which is adapted to indicate the level of the fluid in the vessel A. This flexible faucet is without a stop-cock, and hence it is not liable to get out of order. There are simply a valve-seat, a ball or globe valve, and a cage for retaining the said valve in its place.

Near the upper end of the vessel A, I apply spring-clips G, which are rigidly secured in place, and which are adapted to receive and flexibly hold in an upright position the draw-off tube C.

It is obvious that by manipulating the tube or flexible faucet C the level of the liquid in the vessel A can be ascertained.

By my improvement I prevent waste by leakage, and by using a padlock, H, as indicated, I prevent loss by theft.

The contents of the cask or vessel can at any time be ascertained by siphon adjustment, thus avoiding the old and tedious method of measurement by rod or rule.

Having described my invention, I claim—

1. The flexible tubular faucet provided with a valve on its free end, substantially in the manner and for the purposes described.

2. The combination of a flexible tubular faucet having a valve at the free end thereof with a clip for holding the said faucet in an erect position, substantially in the manner and for the purposes described.

3. The combination of the flexible tubular faucet C, having the ball-valve at the free end thereof, with the clips G and the lock H, all constructed and adapted to operate substantially in the manner and for the purposes set forth.

In testimony that I claim the foregoing as my own I affix my signature in presence of two witnesses.

WILLIAM T. ROBERTSON.

Witnesses:
CHARLES SPEAR,
JAMES A. FARLEY.